United States Patent [19]

Nelson

[11] Patent Number: 4,509,418
[45] Date of Patent: Apr. 9, 1985

[54] SURFACE FOR SUPPORTING CUT FRUIT IN FRUIT JUICER

[75] Inventor: Stewart C. Nelson, Forest Hills, N.Y.

[73] Assignee: The Automatic Orange Juicer Corp., Forest Hills, N.Y.

[21] Appl. No.: 606,434

[22] PCT Filed: Apr. 18, 1983

[86] PCT No.: PCT/US83/00578
§ 371 Date: Mar. 29, 1984
§ 102(e) Date: Mar. 29, 1984

[87] PCT Pub. No.: WO84/04025
PCT Pub. Date: Oct. 25, 1984

[51] Int. Cl.³ .............................................. A23N 1/00
[52] U.S. Cl. ...................................... 100/97; 99/507; 99/508; 100/130; 100/135
[58] Field of Search .................. 99/495, 501, 506–508; 100/97 R, 125, 130, 135, 213, 215, 218, 264, 268

[56] References Cited
U.S. PATENT DOCUMENTS
2,723,618 11/1955 Matthews .............................. 100/97

Primary Examiner—Timothy F. Simone
Attorney, Agent, or Firm—McAulay, Fields, Fisher, Goldstein & Nissen

[57] ABSTRACT

An elastic sheet support means (3) is held over the open portion of a juice collector means (1) of an automatic fruit juice extractor. The elastic support means (3) is held to the front wall (21) and rear wall (20) of the juice collector means by reinforcing rods (11, 12) held within lugs (15, 16) on the front and rear walls (21, 20). The direction in which the elastic sheet support means (3) is held is such that there are no openings adjacent the platform (2) from which cut fruit is fed onto the elastic sheet support means (3). The elastic sheet support means (3) is also formed with reinforcing ridges (32), parallel to the sidewalls (27, 28) of the juice collector means (1), and generally overlying the male cone members (22) which form a portion of the juice extracting means. Additionally, slits (33) are formed between the reinforcing ribs (32), overlying the male cones (22), to allow for movement of the elastic sheet support means (3) over the cones (22) during the expressing operation.

7 Claims, 3 Drawing Figures

SURFACE FOR SUPPORTING CUT FRUIT IN FRUIT JUICER

CROSS REFERENCE TO RELATED APPLICATION

This application is related to PCT/US 83/00111, received Jan. 24, 1983, for "Fruit Cutter and Juicer," in the name of the same party as the present invention.

FIELD OF THE INVENTION

The present invention is directed to apparatus for automatically obtaining juice from citrus fruit, particularly oranges, lemons, and grapefruits. Apparatus of this type is generally well known and employed in both commercial juicing operations and in food serving establishments where juice is freshly squeezed for the consumer.

In such operations, it is necessary that the citrus fruit, particularly oranges, lemons, and grapefruits, be fed to a surface where a cut surface of the citrus fruit is exposed, for example by halving the fruit, and then squeezing the cut pieces so as to extract the juice, without removing the undesirable flavor components from the rind or peel. The juice which has been expressed from the pieces is then recovered, while the rinds are discarded.

Many patents have described the type of machinery generally used in accordance with the present invention. For example, an overall system for fruit juice extraction is shown by Matthews, U.S. Pat. Nos. 2,723,618, and 2,311,565 in the name of Talbert G. Nelson. Each describes a system where oranges, for example, are cut into halves, the halves are advanced, cut surface downward, over stationary male press elements and then squeezed by cup-like female press elements which are moved down axially to interact with the male press elements. When the female press elements are retracted, the rinds are ejected, while the juice from the citrus fruit is recovered.

Similar machines and operations are described, for example, in U.S. Pat. No. 2,629,317, Nelson; U.S. Pat. No. 2,572,286, Smith; U.S. Pat. No. 2,413,866, DuLamey; U.S. Pat. No. 2,531,026, Cadella; U.S. Pat. No. 3,185,072, Rickard; U.S. Pat. No. 2,199,876, Brown; and U.S. Pat. No. 4,088,070, Montagroni et al.

These patents, and others in the field, describe various means for supporting the cut fruit which is squeezed between male and female press elements. Generally, these platforms are rigid, formed of, for example, metal. In the afore-referenced Matthews patent, U.S. Pat. No. 2,723,618 a rubber apron is employed as illustrated, for example, in FIGS. 4 and 9 through 11 of that patent. The sheet is positioned such that the supports for the apron are parallel to the cutting knife which severs the fruit.

It has been found that this type of rubber surface for supporting the cut fruit, while the most widely used in the field, presents problems, particularly when soft fruit is to be squeezed.

The apron or stripper pad described in the aforereferenced Matthews U.S. Pat. No. 2,723,618 patent has a series of slots which are perpendicular to the support members for the sheet and a series of ridges which are parallel with the support. This allows for some flexing of the rubber apron as it is moved downwardly against the cones under the influence of the female press members. However, particularly as illustrated in FIG. 12 of that patent, there is a severe stretching of the rubber sheet during this squeezing operation, resulting in extreme wear.

The Nelson patents previously referred to, U.S. Pat. Nos. 2,311,565 and 2,629,317, employ rigid, possibly metallic platforms to support the orange halves as they are moved downwardly over the cone members by the female press members. The platforms are described as P—P' in the '565 patent and as 110 in the '317 patent. Mechanism must be provided to allow these platforms to move downwardly with their carried fruit pieces, so that the male and female press members may co-act on the cut fruit. Obviously, there is not the extreme stretching and wear on these platforms that is experienced with the rubber apron of Matthews, but substantially more mechanism is required because of the movement necessary to allow the platforms to work in conjunction with the squeezing or pressing elements.

In accordance with this invention, a support surface for the cut fruit is provided which allows for complete squeezing of the cut fruit, removal of the spent rinds from the male press members, avoidance of unsqueezed fruit being forced into the juice collector tray, and at the same time accomplishes all these purposes without undue wear on the support surface or excessive mechanism.

BRIEF DESCRIPTION OF THE INVENTION

As indicated, in an automatic citrus juice juicing machine, the juice which is to be expressed from the fruit is frequently obtained from a fruit which is not firm, but which is in one of varying degrees of softness. If this softness is not taken into account during squeezing of the fruit, then the juice obtained is not of the high quality desired because materials are extracted from the peel or rind, and frequently all of the juice contained within the fruit is not obtained.

In the arrangement according to Matthews, and for a complete understanding of the present invention the disclosure of Matthews, except for the cut fruit support surface, is herein incorporated by reference, there is a danger of cut fruit, particularly soft cut fruit, being forced below the rubber apron which forms the cut fruit support surface. Because of the way in which the rubber apron is aligned in Matthews, an opening is formed along the edge of the rubber apron which abuts the platform where the cut fruits are placed after being severed and split by the upstanding cam pedestal. Because of the manner of mounting the rubber apron in Matthews, merely making this apron larger does not solve the problem, as some type of opening remains, or at least an unsupported surface of the apron, so that further movement of the cut fruit may force it under the apron, rather than onto the apron, where it must be placed in order to be properly squeezed. This problem is particularly severe when soft fruit is employed, as it can be deformed sufficiently easily to force it under the apron.

If fruit is forced under the apron, and thus into the juice collector tray, severe problems result. For example, the presence of the fruit part in the juice collector tray may prevent full interaction between the male and female press members, so that further fruit pieces placed on the support surface are not fully squeezed. Additionally, there is some contamination of the flavor of the juice being squeezed from portions resting on the support surface and being acted upon by the male and female press members, as this juice will run through the rind of the fruit piece which is in the juice collector tray. Still further, a shut down and clean out is necessitated if the problems just raised are to be avoided, so that the fruit part may be removed and, of course, if it is not removed, there are further dangers of contamination of the juice because of the initiation of decay of the cut fruit part which is not removed.

These problems are avoided in accordance with the present invention by rotating the support surface 90° so that the attachment means are perpendicular to the knife blade edge, while the opening between the free edges of the support surface and the juice collector tray are at the extreme edges of the tray, remote from the knife and cam pedestal, so that there is no danger of a piece of cut fruit being forced under the rubber support surface.

Additionally, slits can be formed in the elastic cut fruit support surface in alignment with the cone or male press members, so that when the support surface is forced downwardly, the slits are spread around the cone, allowing better interaction between the male and female press members and a more complete juicing action. This is accomplished without the mechanism required in the afore-referenced Nelson patents, and without the severe stretching and wear of the afore-referenced Matthews patent.

DETAILED DESCRIPTION OF THE INVENTION

Figure 1:
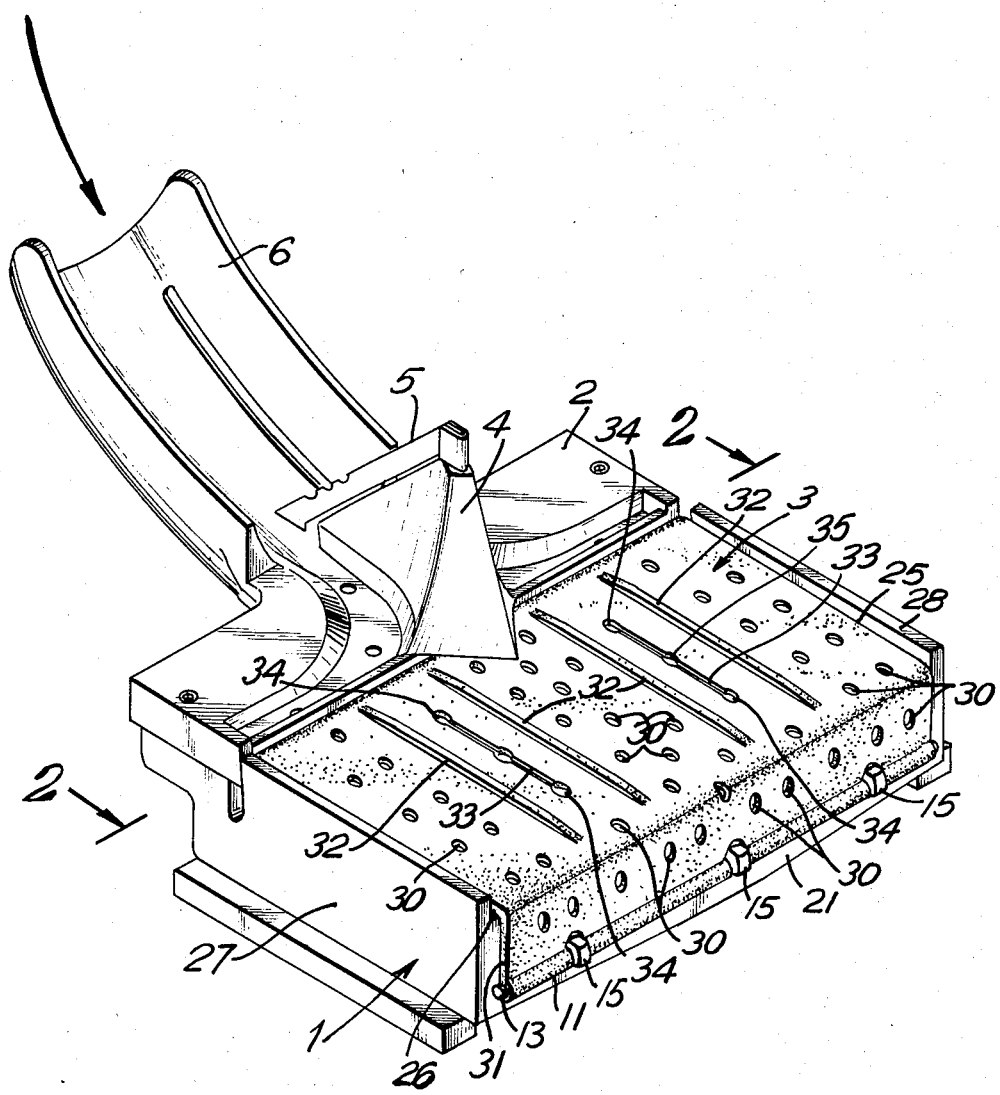
FIG. 1 is a perspective view of a juicing tray having the elastic cut fruit support surface of the present invention, along with the juice collector tray, cutting knife and cam separator, and fruit feed chute.

In accordance with the present invention, and referring particularly to FIG. 1, the fruit cutting and a portion of the juice expressing mechanism of an automatic juicing machine are illustrated. This includes the juice collector tray 1, to a portion of which is attached a platform 2. A cut fruit support member 3 is attached to the upper and side portions of the juice collector tray and overlies the otherwise open upper surface of that tray. Overlying the portions of the platform 2 and cut fruit support surface 3 is a cam pedestal 4 and attached, so as to run along the edge of the cam pedestal opposite the elastic cut fruit support surface, is a knife edge 5. Also illustrated is a whole fruit feed chute 6.

As illustrated, the cut fruit support surface 3 is formed as a sheet of material, the end portions of which are hollow tubular sections 11, 12, through each of which a reinforcing rod 13, 14 is inserted. Portions of the hollow sections and reinforcing rods are forced under lugs 15, 16 to hold the cut fruit support surface 3 in place. Obviously, the sheet portion of member 3 is so sized that stretching is required to place the portions 11, 13 and 12, 14 within lugs 15 and 16. This provides for a flat, stretched portion 17 of the cut fruit support surface 3. A portion of the flat part 17 of the cut fruit support surface 3 rests on the upstanding walls 20 and 21 of the juice collector tray 1. Within the juice collector tray 1 are one or more male press members or cones 22. These interact with female press members (not shown) to squeeze the halves of the cut citrus fruit when those halves are placed on the support surface 3. The juice which is extracted from the fruit is collected in the hollow 24 of the juice collector tray 1 and is continuously drawn off through means not shown.

As illustrated, the only partial openings or free surfaces of the cut fruit support surface 3 occur at the junctures 25 and 26 between the cut fruit support surface 3 and the upstanding sidewalls 27 and 28 of the juice collector tray 1. As is apparent, these openings 25 and 26 are remote from the platform 2 from which the cut fruit halves are moved onto the cut fruit support surface 3.

The cut fruit support surface 3 is provided with a plurality of openings 30 which are formed both on the portion 17 of the surface which is flat across the open upper part of the juice collector tray 1 and on the portions 31 and 32 of the member 3 which, with the member 3 in place, are perpendicular to the portion 17 and on which the hollow, tubular sections 11 and 12 are formed. These openings 30 are provided both to allow juice to pass through the cut fruit support surface and to aid in stretching of the member as it is being affixed to the juice collector tray 1.

Figure 2:
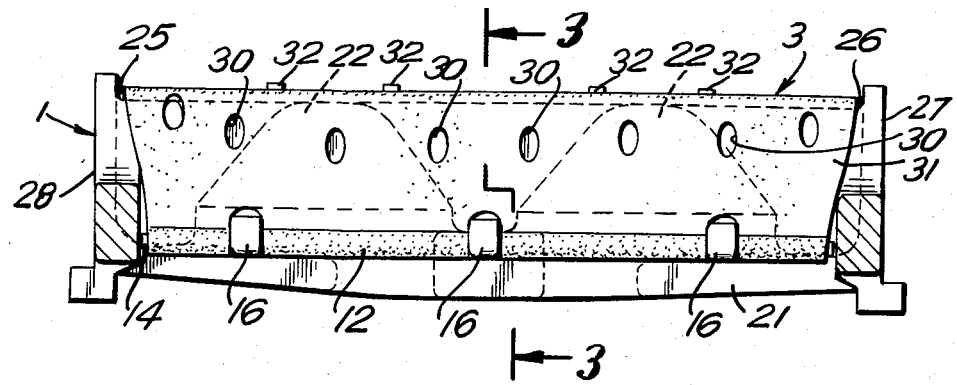
FIG. 2 is a sectional view along the line 2—2 of FIG. 1.
Figure 3:
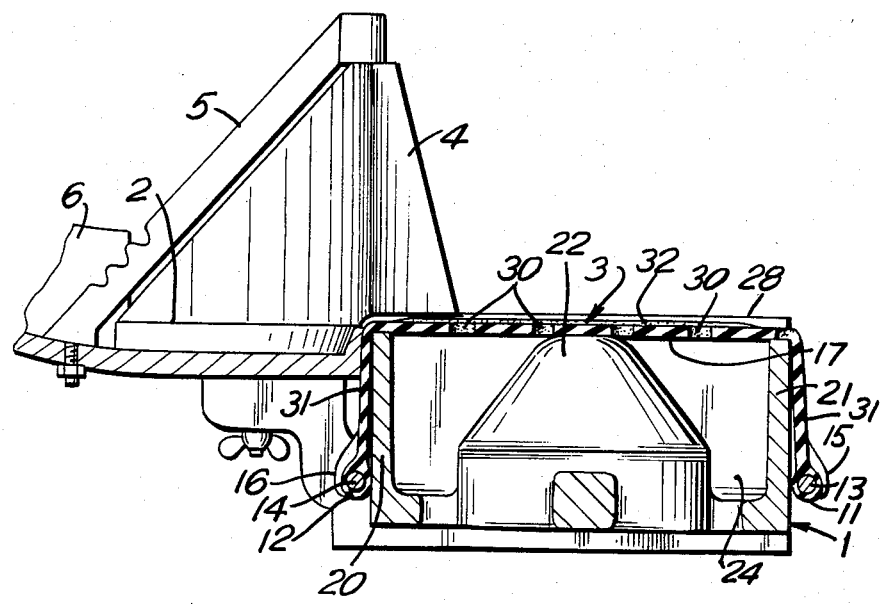
FIG. 3 is a sectional view along the line 3—3 of FIG. 2.

The upper surface of the part 17 of the cut fruit support surface 3 is provided with both reinforcing ridges 32 and slits 33. As will be apparent, particularly from FIG. 2, these ridges 32 essentially bracket the narrowest portion of the cone 22 and aid in reinforcing that portion of the fruit support surface 3 which experiences the most wear during squeezing of the fruit and in guiding the cut fruit sections over the cones to be squeezed.

The slits 33 are formed between each pair of reinforcing ribs 32 and are thus, essentially, centered over each of the cones 22. As illustrated, the slit 33 is not a simple line slit, but rather has widened areas 34 at each end, and a widened portion 35 in the center. While a single widened portion 35 is shown at the center of each of the slits, it will be appreciated that additional widened portions can be formed along the length of the slit. The widened portions 34 are formed at the end of each slit to prevent unintentional extensions of the slit and, thus, maintain the integrity of the slit length. The widened portions 35 are placed along the slit to aid in opening of the slit as the cut fruit support surface 3 is moved downwardly under the action of the female press members.

The cut fruit support surface 3, as previously indicated, is formed of an elastic material. The elastic material which is employed can be rubber, or any of the synthetic elastic materials which will withstand the necessary repeated flexure, and which will be inert to the citrus fruit juices being squeezed from the cut fruit halves.

In operation, whole fruit falls, generally by gravity, down chute 6 to rest against knife blade 5. Means (not shown) force the whole fruit over the knife blade 5 where it is cut into two halves which are spread on the curved surfaces of cam pedestal 4 so as to lie flat on platform 2. Means (not shown) then force the cut halves from the platform surface 2 onto the cut fruit support surface 3, the cut pieces being generally centered over the cones 22. Female press members (not shown) then move downwardly to force the cut fruit halves against cones 22 so as to express the juice from the fruit.

During the squeezing or expressing operation, the elastic cut fruit support surface 3 moves downwardly against and along the cone 22. However, because of the slits 33, there is neither excessive stretching, or undue wear, of the cut fruit support surface 3. As the surface 3 is forced downwardly, the slit 33 widens, relieving the stress on the surface and, at the same time, allowing the cut fruit to come into more direct contact with the male press member or cone 22.

On completion of the squeezing operation, the female press members are moved upwardly, away from the cut fruit support surface 3, allowing this surface 3 to return to the original position shown in the drawings of the present invention. In moving to this original position, the slit 33 closes and, as upward movement is continued, removes the spent rind or peel from the cone 22. When the cut fruit support surface 3 has fully returned to its original position, this spent rind or peel rests upon the surface where it may be removed and discarded by means not shown.

While specific embodiments of the invention have been shown and described, the invention is to be considered as limited only by the appended claims.

I claim:

1. In a citrus fruit juice extractor having means for feeding whole citrus fruit to the extractor, means for cutting the fruit, means for feeding the cut fruit to a supporting surface, means above and below the support surface for expressing the juice from the cut fruit, and means for collecting the juice expressed from the fruit, the improvement comprising:
   a. means for collecting the juice expressed from the fruit comprising a juice collector tray having a bottom, side support walls parallel to said means for cutting said fruit and front and rear walls perpendicular to said means for cutting said fruit;
   b. an elastic sheet member for supporting said cut fruit during expressing of the juice from said cut fruit, said elastic sheet member being supported by said front and rear walls of said juice collecting means and being held in place on the outer portions of said front and rear walls, the opening between said elastic sheet member and said juice collecting means being remote from the location of feeding of said cut fruit onto said elastic sheet member.

2. The apparatus of claim 1 wherein the elastic support means is formed with a plurality of openings to provide for passage of the juice expressed from the cut fruit.

3. The apparatus of claim 1 wherein reinforcing ridges are formed on the upper portion of said elastic sheet support means, parallel to said means for cutting said fruit, and generally overlying the means in said juice collector means for expressing of said juice.

4. The apparatus of claim 1 wherein the elastic sheet support means has a slit formed in a direction parallel to the fruit cutting means, said slit overlying said means in said juice collector means for expressing juice from the fruit.

5. The apparatus of claim 4 wherein the slit portions are formed with enlarged ends to prevent lengthening of the slits.

6. The apparatus of claim 1 wherein the portion of said elastic support means overlying the outer portion of said front and rear walls is formed, at the ends, with a hollow tubular section, and a reinforcing rod is inserted through said hollow tubular section.

7. The apparatus of claim 6 wherein said reinforcing rod is held beneath lugs formed on the outer portion of the front and rear support walls of said juice collector means.

* * * * *